US008645389B2

(12) United States Patent
Oliver et al.

(10) Patent No.: US 8,645,389 B2
(45) Date of Patent: Feb. 4, 2014

(54) SYSTEM AND METHOD FOR ADAPTIVE TEXT RECOMMENDATION

(75) Inventors: Jonathan James Oliver, San Jose, CA (US); Wray Lindsay Buntine, Berkley, CA (US); George Roumeliotis, Menlo Park, CA (US)

(73) Assignee: SonicWALL, Inc., San Jose, CA (US)

( * ) Notice: Subject to any disclaimer, the term of this patent is extended or adjusted under 35 U.S.C. 154(b) by 1468 days.

(21) Appl. No.: 11/003,920

(22) Filed: Dec. 3, 2004

(65) Prior Publication Data

US 2009/0089272 A1 Apr. 2, 2009

Related U.S. Application Data

(63) Continuation of application No. 09/723,855, filed on Nov. 27, 2000, now Pat. No. 6,845,374.

(51) Int. Cl.
*G06F 17/30* (2006.01)

(52) U.S. Cl.
USPC ............ 707/748; 707/723; 707/737; 707/917

(58) Field of Classification Search
None
See application file for complete search history.

(56) References Cited

U.S. PATENT DOCUMENTS

| | | | |
|---|---|---|---|
| 5,164,897 A | | 11/1992 | Clark et al. |
| 5,519,857 A | | 5/1996 | Kato et al. |
| 5,598,557 A | * | 1/1997 | Doner et al. ................. 1/1 |
| 5,659,766 A | | 8/1997 | Saund et al. |
| 5,727,129 A | | 3/1998 | Barrett et al. |
| 5,754,938 A | | 5/1998 | Herz et al. |
| 5,754,939 A | | 5/1998 | Herz et al. |
| 5,787,421 A | * | 7/1998 | Nomiyama ..................... 1/1 |
| 5,796,952 A | | 8/1998 | Davis et al. |
| 5,854,630 A | | 12/1998 | Nielsen |
| 5,857,179 A | * | 1/1999 | Vaithyanathan et al. ......... 1/1 |
| 5,867,799 A | | 2/1999 | Lang et al. |
| 5,913,215 A | | 6/1999 | Rubinstein et al. |

(Continued)

FOREIGN PATENT DOCUMENTS

| | | |
|---|---|---|
| WO | WO 98/53624 | 11/1998 |
| WO | WO 98/57490 | 12/1998 |

(Continued)

OTHER PUBLICATIONS

U.S. Appl. No. 11/589,007 Final Office Action mailed Mar. 28, 2011.

(Continued)

*Primary Examiner* — Sangwoo Ahn
(74) *Attorney, Agent, or Firm* — Lewis Roca Rothgerber LLP

(57) ABSTRACT

Network system provides a real-time adaptive recommendation set of documents with a high statistical measure of relevancy to the requestor device. The recommendation set is optimized based on analyzing the text of documents of the interest set, categorizing these documents into clusters, extracting keywords representing the themes or concepts of documents in the clusters, and filtering a population of eligible documents accessible to the system utilizing site and or Internet-wide search engines. The system is either automatically or manually invoked and it develops and presents the recommendation set in real-time; for example, upon logging onto a web site or as the client views additional documents or pages of a website. The recommendation set may be presented as a greeting, notification, alert, HTML fragment, fax, voicemail, or automatic classification or routing of customer e-mail, personal e-mail, job postings, and offers for sale or exchange.

9 Claims, 13 Drawing Sheets

(56) References Cited

U.S. PATENT DOCUMENTS

| | | |
|---|---|---|
| 5,978,799 A | 11/1999 | Hirsch |
| 6,029,141 A | 2/2000 | Bezos et al. |
| 6,078,914 A | 6/2000 | Redfern |
| 6,078,918 A | 6/2000 | Allen et al. |
| 6,115,709 A | 9/2000 | Gilmour et al. |
| 6,125,173 A | 9/2000 | Jagadish et al. |
| 6,154,783 A | 11/2000 | Gilmour et al. |
| 6,167,397 A * | 12/2000 | Jacobson et al. ............ 1/1 |
| 6,202,083 B1 | 3/2001 | Chrabaszcz |
| 6,236,975 B1 | 5/2001 | Boe et al. |
| 6,314,420 B1 | 11/2001 | Lang et al. |
| 6,317,722 B1 * | 11/2001 | Jacobi et al. ............ 705/14.51 |
| 6,345,293 B1 | 2/2002 | Chaddha |
| 6,401,096 B1 | 6/2002 | Zellweger |
| 6,480,885 B1 | 11/2002 | Olivier |
| 6,484,149 B1 | 11/2002 | Jammes et al. |
| 6,493,702 B1 | 12/2002 | Adar et al. |
| 6,542,905 B1 | 4/2003 | Fogel et al. |
| 6,567,800 B1 | 5/2003 | Barrera |
| 6,633,868 B1 | 10/2003 | Min |
| 6,654,735 B1 | 11/2003 | Eichstaedt et al. |
| 6,654,787 B1 | 11/2003 | Aronson et al. |
| 6,692,359 B1 | 2/2004 | Williams et al. |
| 6,718,365 B1 | 4/2004 | Dutta |
| 6,801,929 B1 | 10/2004 | Donoho et al. |
| 6,845,374 B1 | 1/2005 | Oliver et al. |
| 7,158,986 B1 * | 1/2007 | Oliver et al. ............ 1/1 |
| 7,451,388 B1 | 11/2008 | Henzinger |
| 7,644,075 B2 * | 1/2010 | Zeng et al. ............ 707/999.005 |
| 2002/0038357 A1 | 3/2002 | Haverstock et al. |
| 2002/0116378 A1 * | 8/2002 | Zhai ............ 707/5 |
| 2003/0046270 A1 | 3/2003 | Leung et al. |
| 2004/0230598 A1 * | 11/2004 | Robertson et al. ............ 707/102 |
| 2005/0081139 A1 | 4/2005 | Witwer et al. |
| 2007/0043817 A1 | 2/2007 | Oliver et al. |
| 2008/0189253 A1 | 8/2008 | Oliver et al. |
| 2012/0215868 A1 | 8/2012 | Oliver et al. |

FOREIGN PATENT DOCUMENTS

| | | |
|---|---|---|
| WO | WO 99/32985 | 7/1999 |
| WO | WO 00/30010 | 5/2000 |
| WO | WO 02/065327 | 8/2002 |
| WO | WO 2004/052010 | 6/2004 |

OTHER PUBLICATIONS

U.S. Appl. No. 11/589,007 Office Action mailed Dec. 1, 2010.
U.S. Appl. No. 11/589,007 Final Office Action mailed Jan. 22, 2010.
U.S. Appl. No. 11/589,007 Office Action mailed Mar. 4, 2009.
U.S. Appl. No. 11/589,007 Office Action mailed Dec. 18, 2008.
U.S. Appl. No. 13/460,774 Office Action mailed Nov. 1, 2012.
U.S. Appl. No. 11/927,450 Office Action mailed May 26, 2010.
U.S. Appl. No. 11/927,450 Office Action mailed Dec. 8, 2009.

* cited by examiner

SYSTEM AND METHOD FOR ADAPTIVE TEXT RECOMMENDATION

CROSS-REFERENCE TO RELATED APPLICATIONS

This application is a continuation and claims the priority benefit of U.S. patent application Ser. No. 09/723,855 filed Nov. 27, 2000, now U.S. Pat. No. 6,845,374, and titled "System and Method for Adaptive Text Recommendation," the disclosure of which is incorporated herein by reference.

BACKGROUND INFORMATION

1. Field of Invention

Invention relates to a method and system for recommending relevant items to a user of an electronic network. More particularly, the present invention relates to a means of analyzing the text of documents of interest and recommending a set of documents with a high measure of statistical relevancy.

2. Description of Related Art

Most personalization and web user analysis (also known as "clickstream") technologies work with the system making a record of select web pages that a user has viewed, typically in a web log. A web log entry records which users looked at which web pages in the site. A typical web log entry consist of two major pieces of information, namely, first, some form of user identifier such as an IP address, a cookie ID, or a session ID, and second, some form of page identifier such as a URL, file name, or product number. Additional information may be included such as the page the user came from to get to the page and the time when the user requested the page. The web log entry records are collected in a file system of a web server and analyzed using software to produce charts of page requests per day or most visited pages, etc. Such software typically relies on simple aggregations and summarizations of page requests rather than any analysis of the internal page structure and content.

Other personalization software also relies on the concept of web logs. The dominant technology is collaborative filtering, which works by observing the pages of the web site a user requests, searching for other users that have made similar requests, and suggesting pages that these other users requested. For example, if a user requests pages 1 and 2, a collaborative filtering system would find others who did the same. If the other users on the average also requested pages 3 and 4, a collaborative system would offer pages 3 and 4 as a best recommendation. Other collaborative filtering systems use statistical techniques to perform frequency analysis and more sophisticated prediction techniques using methods such as neural networks. Examples of collaborative filtering systems include NetPerceptions, LikeMinds™, and WiseWire™. Such a system in action can be viewed at Amazon.com™.

Other types of collaborative filtering systems allow users to rank their interest in a group of documents. User answers are collected to develop a user profile that is compared to other user profiles. The document viewed by others with the same profile is recommended to the user. This approach may use artificial intelligence techniques such as incremental learning methods to improve the recommendations based on user feedback. Systems using this approach include SiteHelper, Syskill & Ebert, Fab, Libra, and WebWatcher. However, collaborative filtering is ineffective to personalize documents with dynamic or unstructured content. For example, each auction in an auction web site or item offered in a swap web site is different and may have no logged history of previous users to which collaborative filtering can be applied. Collaborative filtering is also not effective for infrequently viewed documents or offerings of interest to only a few site visitors.

Clearly, there is a need for a system that considers not only the identifiers of the pages the user viewed but also the words in the pages viewed in order to make more focused recommendations to the user. Broadening the concept of pages to documents in general, there is a need for a recommendation system that analyzes the words in the document a user has expressed interest in. Such a recommendation system should support options of residing in the same computer as the web site, or on a remote server, or on an end user's computer. Furthermore, the system should be able to access documents from external sources such as from other web sites throughout the Internet or from private networks. A flexible recommendation system should also support a scalable architecture of using a proprietary text search engine or leverage off the search engines of other web sites or generalized Internet-wide search engines.

SUMMARY OF INVENTION

Invention discloses methods and systems for adaptively selecting relevant documents to present to a requestor. A requestor device, either a client working on a PC, or a software program running on a server, automatically or manually invokes the adaptive text recommendation system (ATRS) and based on extracted keywords from the text of related documents, a set of relevant documents is presented to the requestor. The set of recommended documents is continually updated as more documents are added to the set of related documents or interest set. ATRS adapts the choice of recommended documents based on new analysis of text contained in the interest set, categorizing the documents into clusters, extracting the keywords that capture the theme or concept of the documents in each cluster, and filtering the entire set of eligible documents in the application web site and or other web sites to compile the set of recommended documents with a high measure of statistical relevancy.

One embodiment is an application of ATRS in an e-commerce site, such as a seller of goods or services or an auction web site. A client logging onto an e-commerce site is greeted with a recommended set of relevant goods, services, or auction items by to analyzing the text of the documents representing items previously bought, ordered, or bid on. As the client selects an item from the recommended set or an item on the web page, ATRS updates the documents in the interest set, categorizes the documents in the interest set into clusters, extracts keywords from the clusters, and filters the eligible set of documents at the web site to construct a recommended set. This recommended set of documents is rebuilt possibly every time the client makes a new selection or moves to a different web page.

The recommended set of documents may be presented as a panel or HTML fragment in a web page being viewed. The recommendations may be ordered for example by the statistical measure of relevancy or by popularity of the item and filtered based on information about the client.

In an alternate embodiment, ATRS may be invoked automatically by a software program to develop a recommended set for existing clients not currently logged on. The recommendations may take the form of a notification of select clients for sales, special events, or promotions. In other alternate embodiments, the recommendations may take the form of a client alert or "push" technology data feed. Similarly, other applications of ATRS include notification of clients of upcoming television shows, entertainment, or job postings based on the analysis of the text of documents associated with these shows, entertainment or job openings in which the client has indicated previous interest.

Additional applications of ATRS include automatic classification of personal e-mail, and automatic routing of customer relations e-mail to representatives who previously successfully resolved similar types of e-mail. The recommended set may also consist of Internet bookmarks or subscriptions to publications for a "community of interest" group. Furthermore, the recommended set may be transmitted as a fax, converted to audio, video, or an alert on a pager or PDA and transmitted to the requester.

The present invention can be applied to data in general, wherein a requestor device issues a request for recommended data comprising documents, audio files, video files or multimedia files and an adaptive data recommendation system would return a recommended set of such data.

BRIEF DESCRIPTION OF DRAWINGS

FIG. 10A is an architectural diagram of ATRS operable in the application website whereas

DETAILED DESCRIPTION OF PREFERRED EMBODIMENT(S)

Figure 1A:
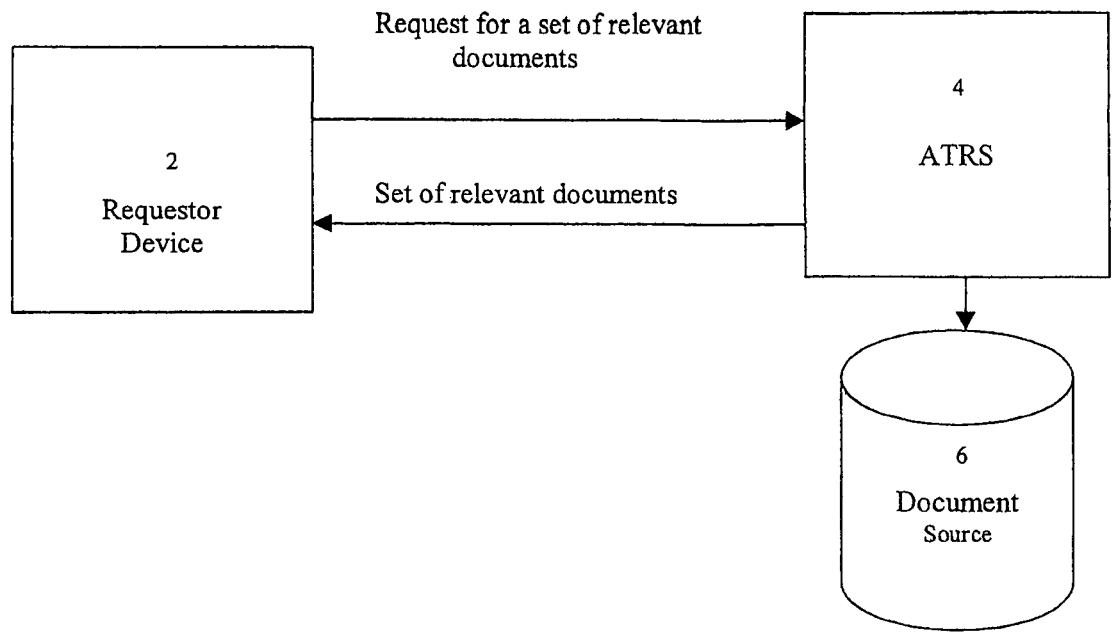
FIG. 1A-1B are an architectural diagram and flow diagram, respectively, illustrating an adaptive text recommendation system invoked by a requestor device, in one embodiment of the present invention.
Figure 1B:
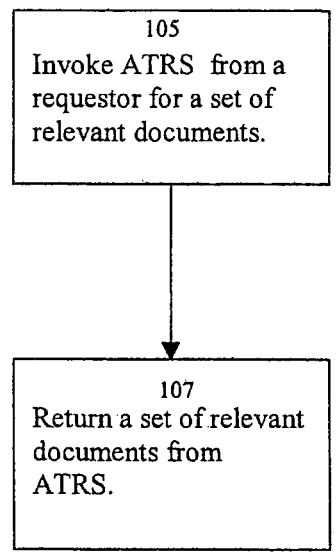

FIG. 1A shows how the requestor device 2 invokes either manually or automatically a request for a set of relevant documents to ATRS 4 which processes the request and obtains a set of relevant documents from a document source 6 and returns the set to requestor device 2. FIG. 1B is a high level flow diagram of ATRS consisting of steps where ATRS is invoked manually or automatically by a requestor for a set of relevant documents 105 and ATRS returns a set of relevant documents 107. A requestor may be a client or a software program. A requestor device may be a client personal computer.

Figure 2:
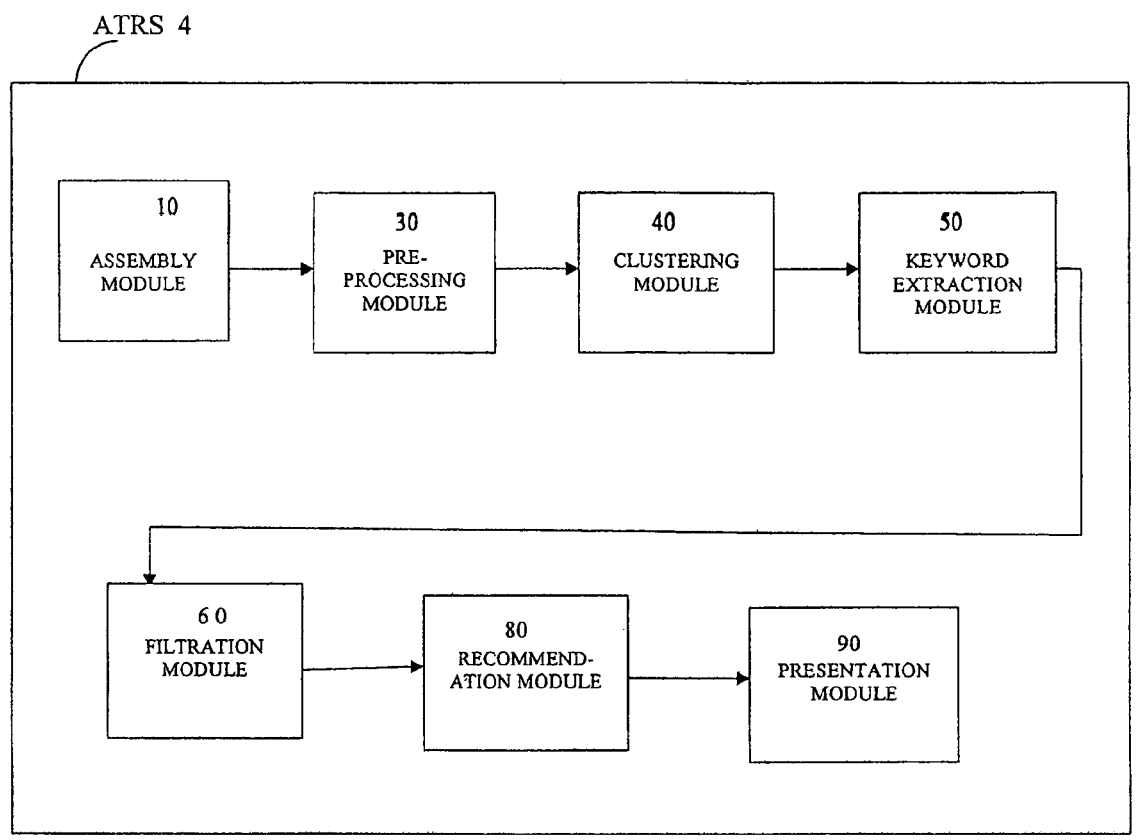
FIG. 2 is an architectural diagram of the main components or modules of an adaptive text recommendation system in one embodiment of the present invention.

FIG. 2 shows the major modules of one embodiment of the present invention. The major modules are: Assembly Module 10, Pre-processing Module 30, Clustering Module 40, Keyword Extraction Module 50, Filtration Module 60, Recommendation Module 80, and Presentation Module 90.

The Assembly Module 10 assembles documents from multiple sources into an interest set. Documents in the interest set may include documents in a database considered of interest to the requester, web site pages previously viewed by the requestor in the application web site or other web sites, documents selected by the requester from a list obtained by a search in the application web site or by an Internet-wide search, e-mail sent by the requester, documents transmitted from a remote source such as those maintained in remote servers or in other private network databases, and documents sent by fax, scanned or input into any type of computer and made available to the Assembly Module 10. For example, in an auction site, the client, presented with a list of live auction items, clicks on several auction items that are of interest, then invokes ATRS to show a set of recommended auction items.

The Pre-processing Module 30 isolates the words in the interest set and removes words that are not useful for distinguishing one document from another document. Words removed are common words in the language and non-significant words to a specific application of ATRS.

The Clustering Module 40 groups the documents whose words have a high degree of similarity into clusters.

The Keyword Extraction Module 50 determines the keyword score for each word in a cluster and selects as keywords for the cluster words with the highest keyword score and that also appear in a minimum number of documents specified for the application.

The Filtration Module 60 uses application parameters for assembling documents considered eligible for recommendation. Eligible documents may include documents from enterprise databases, documents from private network databases, documents from the application web site, and documents from public networks, such as the Internet. Furthermore, these documents may cover subjects in many fields including but not limited to finance, law, medicine, business, environment, education, science, and venture capital. Application parameters may include age of documents and or client data that specify inclusion or exclusion of certain documents.

The Recommendation Module 80 calculates the relevance score for eligible documents to a cluster and ranks the eligible documents by relevance score and other application criteria. Top scoring documents are further filtered by criteria specific to the client.

The Presentation Module 90 personalizes the presentation format of the recommendations for the client. Examples of formats are e-mail, greetings to a site visitor, HTML fragment or a list of Internet sites. Any special sorting or additional filtration for the client is applied. The recommendations are converted to the desired medium, such as voicemail, fax hardcopy, file transfer transmission, or audio/video alert.

Figure 3:
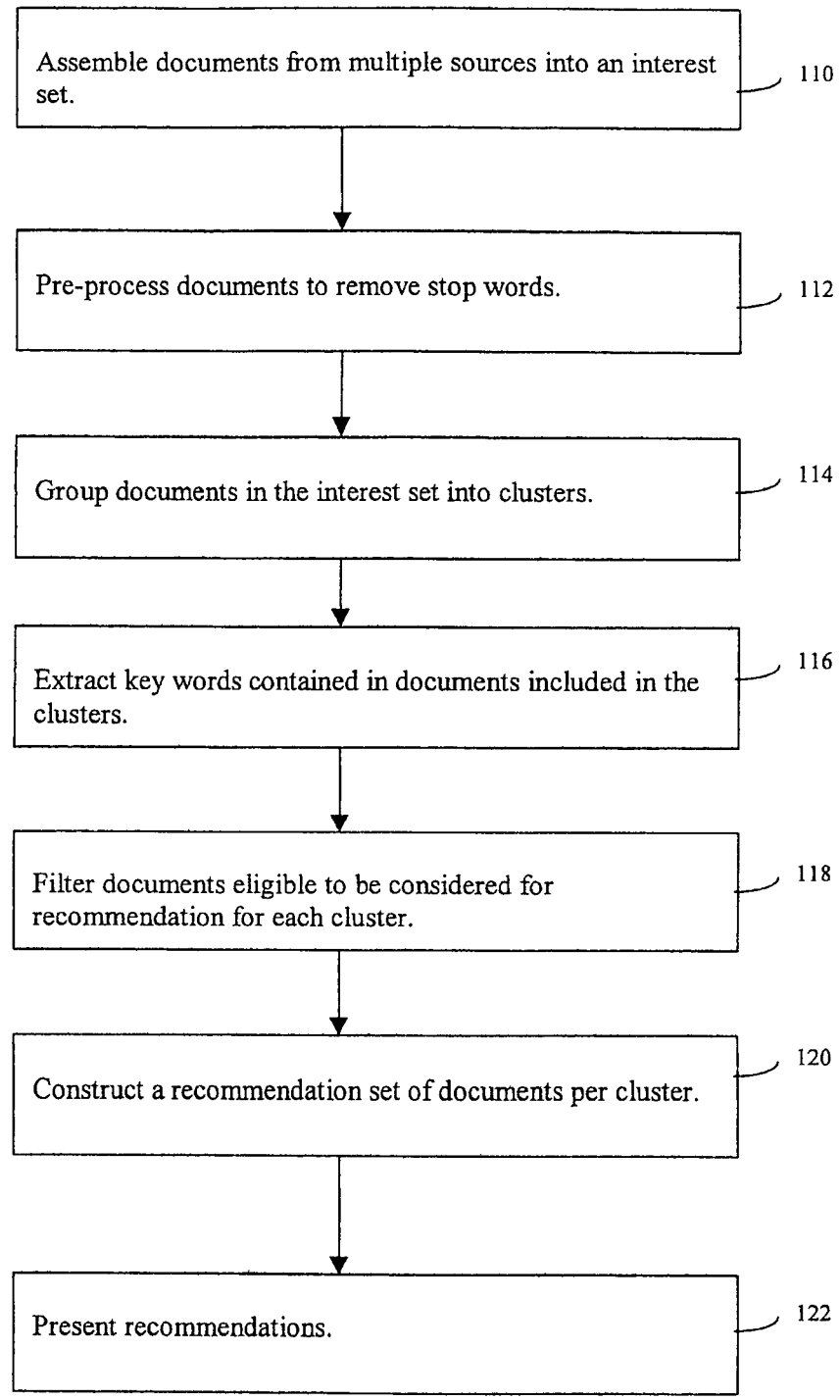
FIG. 3 is a flow diagram of the main components or modules of an adaptive text recommendation system in one embodiment of the present invention.

FIG. 3 is a flow chart of one embodiment of the present invention starting with the assembly of documents from multiple sources into an interest set 110; pre-processing of the documents to remove "stop" words 112; grouping the documents in the interest set into clusters 114; extraction of keywords contained in documents included in the clusters 116; filtration of documents eligible to be considered for recommendation for each cluster 118; construction of a recommendation set of documents per cluster 120; and presentation of the recommendations 122.

Figure 4:
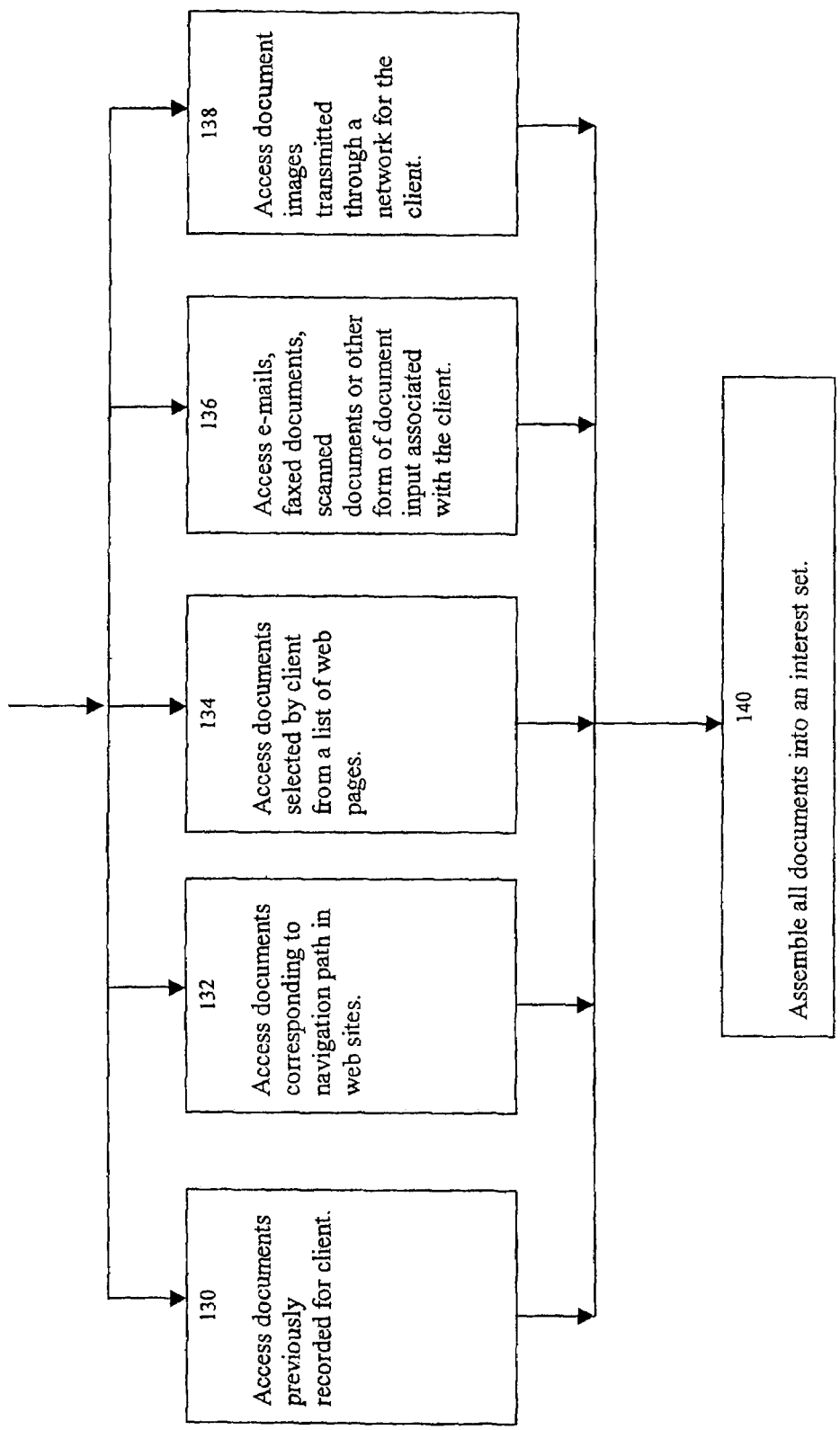
FIG. 4 is a flow diagram of the assembly processing of ATRS in one embodiment of the present invention.

FIG. 4 is a flow chart of the Assembly Module 10 illustrating the process involved in assembling all documents which comprise the interest set. Documents previously recorded for the client 130 may include previous purchases in a e-commerce site, bids in an auction site, or web pages visited by client which contain tags that automatically trigger communication to a server of the page or data involved. Documents may include those corresponding to the navigation path of the client in the website 132. The client may have selected documents from a list of web pages 134 as a result of a site search or an Internet-wide search. Other documents may include e-mails, faxed document, scanned documents or any other form of document input associated with the client 136. Alternatively, documents included may be those transmitted through a network for the client 138 where the storage of documents is done remotely. All input documents are assembled into an interest set 140.

Figure 5:
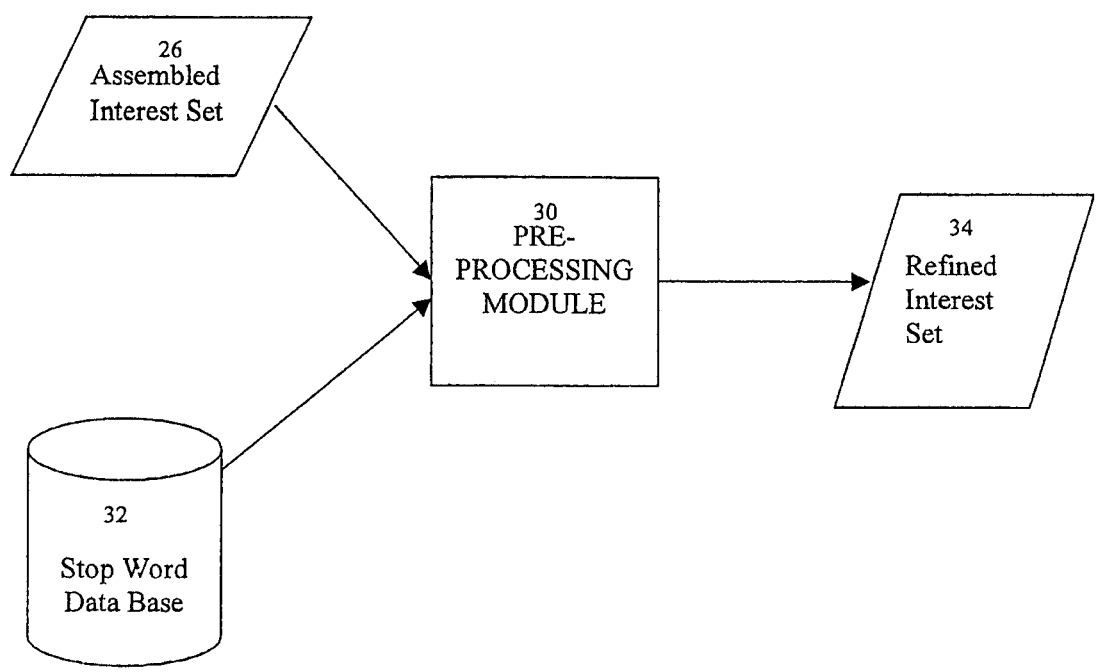
FIG. 5 is an architectural diagram of the pre-processing of the interest set of ATRS in one embodiment of the present invention.

FIG. 5 is an architectural chart illustrating the use of the assembled interest set 26 and the Stop Word Database 32 in the Pre-processing Module 30 to create the refined interest set of documents 34. The Stop Word Database 32 comprises words that are not useful for distinguishing one document from another document in the interest set. If the application language is English, examples would include words such as 'and', 'the', and 'etc.' The Stop Word Database 32 also includes words that are common in the interest set as a result of the purpose, application or business conducted for the site. For example, on an auction site, each web page containing an item description might also contain the notice "Pay with your Visa card!" In this case, the words 'pay', 'visa', and 'card' would be included in the Stop Word Database 32.

Figure 6:
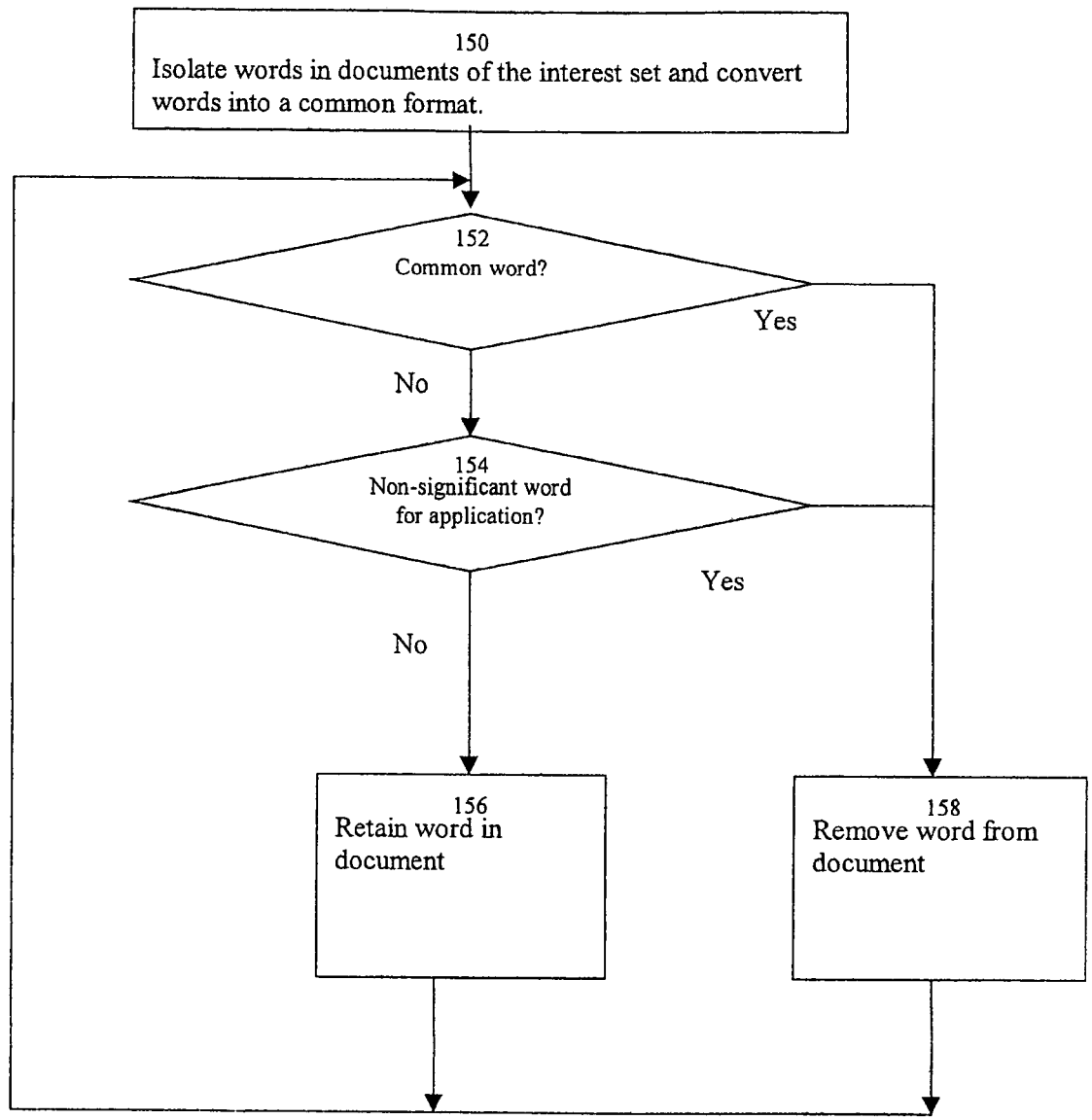
FIG. 6 is a flow diagram of the pre-processing of ATRS in one embodiment of the present invention.

FIG. 6 is a flow chart illustrating the process performed in the Pre-processing Module 30 in one embodiment. The process includes isolating words in the documents of the interest set and converting the words into a common format 150, such as converting the words to lower case. A word is an alphanumeric string surrounded by white space or punctuation marks. Next, if a word is a common word of the language 152 the word is removed 158. If a word is a non-significant word specific to the site and the application 154, it is also removed 158. Otherwise, the word is retained in the document 156. In one embodiment, the common words of the language and the non-significant words specific to the application are maintained in the Stop Word Database 32.

Figure 7:
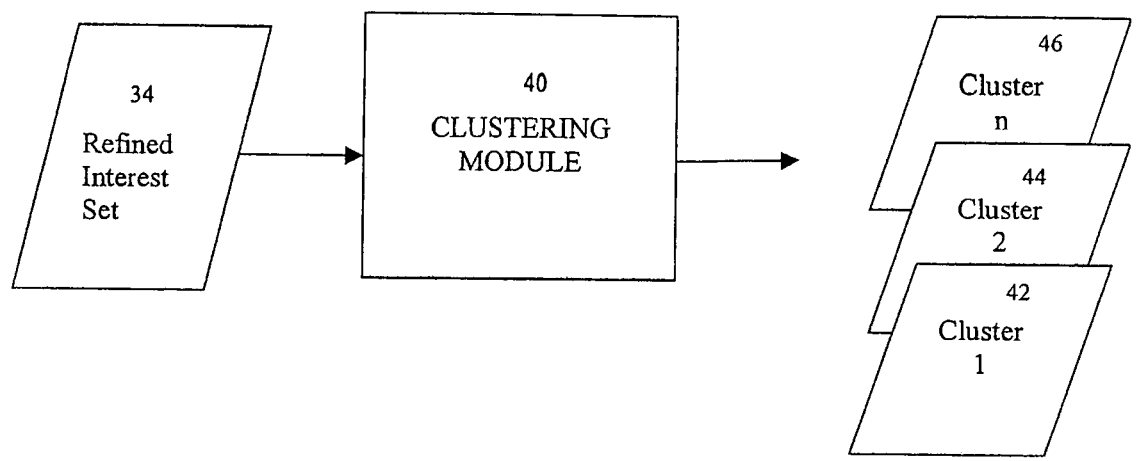
FIG. 7 is an architectural diagram of the clustering process of ATRS in one embodiment of the present invention.

FIG. 7 is an architectural chart illustrating the use of the refined interest set 34 and processing in the Clustering Module 40 to group the documents into clusters 42, 44, and 46. Clustering is the process of grouping together documents in the interest set whose words have a high degree of similarity. In one embodiment of the present invention, the similarity of two documents $D_1$ and $D_2$ is denoted by similarity$(D_1, D_2)$. If $D_1$ does not contain any words in common with $D_2$, then:

$$\text{similarity}(D_1, D_2) = 0.$$

If the two documents have words in common, then:

$$\text{similarity}(D_1, D_2) = \frac{\sum_{w \in D_1 \cap D_2} \text{count}(w, D_1) \text{count}(w, D_2)}{\left[\sum_{w \in D_1 \cap D_2} \text{count}(w, D_1)^2\right]^{1/2} \left[\sum_{w \in D_1 \cap D_2} \text{count}(w, D_2)^2\right]^{1/2}},$$

where count(w, D) denotes the number of occurrences of the word w in the document D, and $w \in D_1 \cap D_2$ denotes a word that appears in both $D_1$ and $D_2$. Many other definitions of similarity between two documents are possible.

The clustering criteria may vary depending on the application of ATRS 4. An advantageous implementation involves arranging the documents from the interest set so as to maximize the cluster score, wherein the cluster score of a cluster containing only one document is zero and the cluster score for a cluster containing more than one document is the average similarity score between the documents in the cluster.

The clustering algorithm can be any one of well-known clustering algorithms that can be applied to maximize the clustering criterion, such as K-Means, Single-Pass, or Buckshot, which are incorporated by reference.

Figure 8:
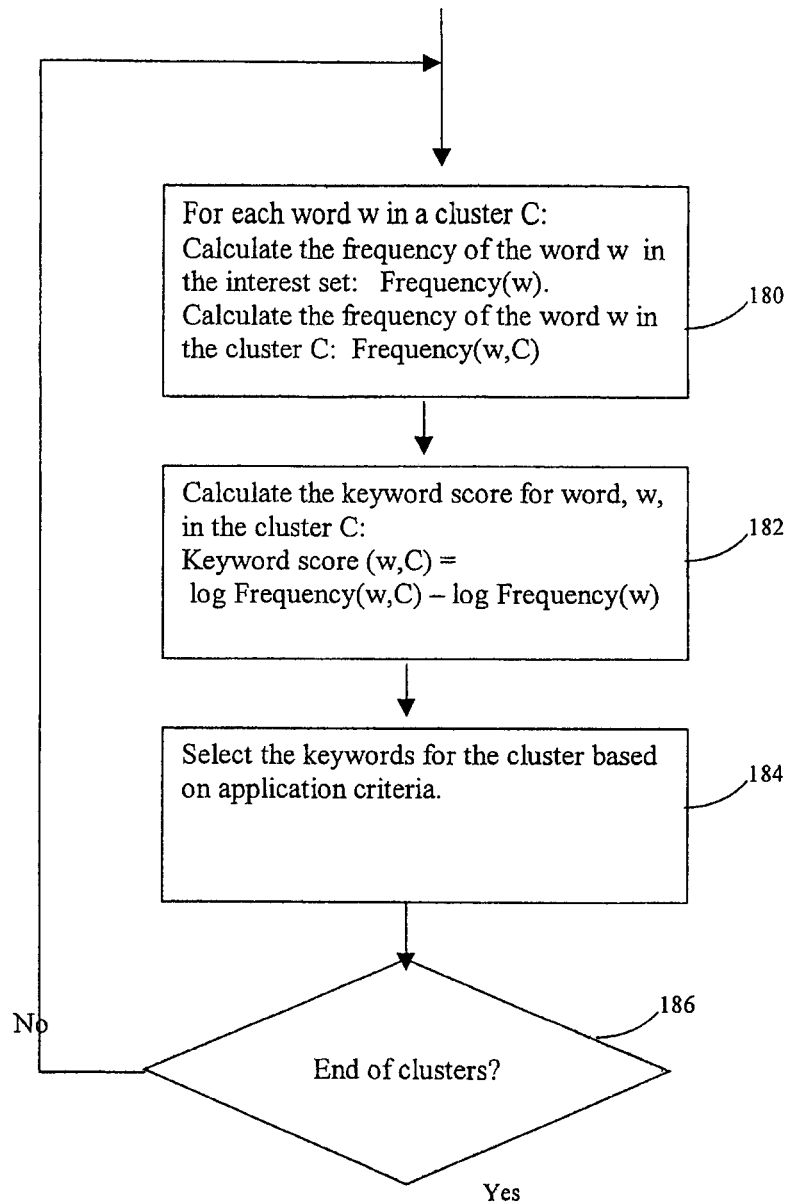
FIG. 8 is a flow diagram of the keyword extraction process of ATRS in one embodiment of the present invention.

FIG. 8 is a flow diagram of the keyword extraction processing of ATRS 4 in one embodiment of the present invention. For each word w in a cluster C, calculate the frequency of the word w in the interest set, Frequency(w); and calculate the frequency of the word w in cluster C, Frequency(w, C) 180. Calculate the keyword score for word w in the cluster C 182, using the equation:

Keyword score$(w,C)$=log Frequency$(w,C)$–log Frequency$(w)$.

Select keywords for cluster C based on application criteria 184; for example, select keywords that have high scores and appear in several documents. Upon processing all clusters 186, the system proceeds to the balance of processing. In an alternative embodiment of the present invention, the keywords describing the theme or concept in a cluster do not necessarily appear in the text of any document, but instead summarize the theme or concept determined, for example, by a method for natural language understanding.

Figure 9:
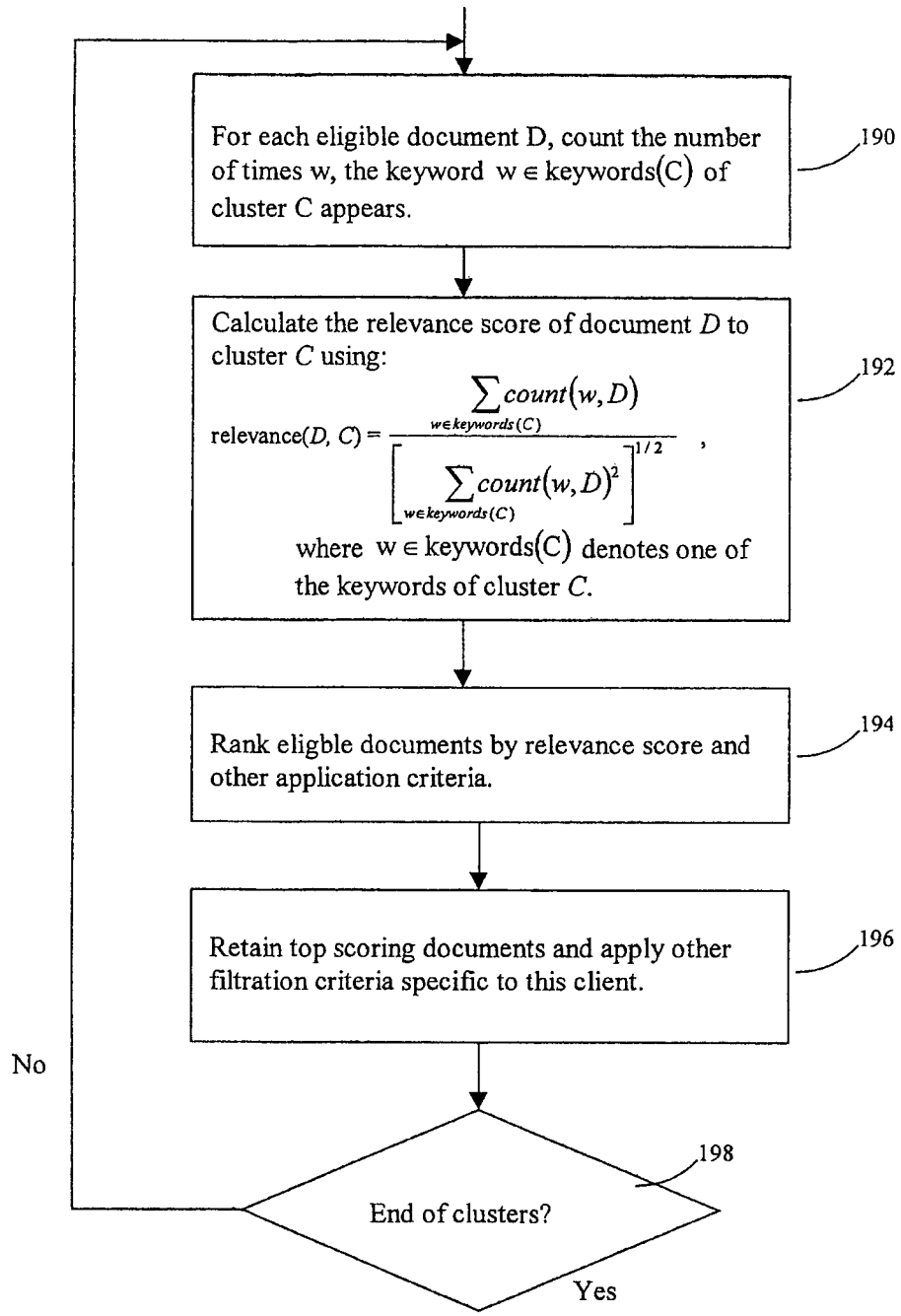
FIG. 9 is a flow diagram of the recommendation processing of ATRS in one embodiment of the present invention.

FIG. 9 is a flow diagram of the recommendation processing of ATRS 4 in one embodiment of the present invention. For each eligible document D, count the number of times the keyword w∈keywords(C) appears 190. Calculate the relevance score of document D to cluster C using the equation:

$$\text{relevance}(D, C) = \frac{\sum_{w \in keywords(C)} \text{count}(w, D)}{\left[\sum_{w \in keywords(C)} \text{count}(w, D)^2\right]^{1/2}},$$

where w∈keywords(C) denotes one of the keywords of cluster C.

Rank eligible documents by relevance score and other application criteria 194. Retain top scoring documents and apply other filtration criteria specific to this client 196. For example, the client may only want documents created within the last seven days. At the completion of all clusters 198, the system proceeds to the balance of processing.

The presentation of recommendations may be through a set ordered by relevance score, set ordered by popularity of document, a greeting to a site visitor, a notification of a sale, event, or promotion, a client alert, for example, a sound indicating presence of a new document, or a new article obtained from a newswire as in "push" data feed delivery methods, notification of TV shows and entertainment based on processing the descriptions of previously viewed TV programs or purchased tickets for entertainment shows. Hard copy formats in the form of postcards, letters, or fliers may also be the medium of presentation.

Another embodiment of the present invention is conversion of the recommendation set of documents into files for faxing to the client, conversion to voice and presenting it as a voice-mail, a pager or audio or video alert for the client. Advantageously, such recommendations can be sent through a network and stored for later retrieval. In another embodiment, the system may serve a "community of interest" like a wine connoisseur's Internet list or chat room where the recommendation may consist of the popular magazines or web pages viewed by experts of the community of interest. Alternatively, the recommendation may be presented to the client or requestor as a set of Internet bookmarks.

There are several alternative embodiments of the present invention. In a document classification application, customer e-mails sent to a company's customer service representative (CSR) department can be routed to the CSR that had successfully resolved similar e-mails containing the same issues. A similar application is the automatic classification of personal e-mail wherein ATRS processes e-mails read and or responded to by the client, applying the clustering/keyword extraction/filtering/recommending steps to present the recommended e-mails to the client, treating the rest as miscellaneous. The client may further specify presentation of the top ten e-mails only, a very useful feature for e-mail access on wireless devices. Other classification applications are automatic routing of job postings to a job category, and automatic classification of classified advertisements or offers for sale or offers to swap items or services.

Other applications of ATRS involve research either in the Internet or in enterprise databases. For example, a client may be interested in "banking". Instead of sifting through multitudes of documents that contains "banking", the client may "mark" several documents and invoke ATRS to present a set of recommended documents with a high measure of statistical relevance. This research may be invoked on a periodic basis wherein ATRS presents the recommended set of documents to the client in the form of a notification or to clients in the "community of interest" application.

In another application of ATRS, online auction participants who have lost an auction are sent e-mail or other notification containing a list of auctions that are similar to the one they lost. This list is generated based on textual analysis of the description of the lost auction.

Another application of ATRS involves analyzing the text of news stories or other content being viewed by a site visitor and displaying a list of products whose descriptions contain similar themes or concepts. For example, a visitor to a web site featuring stories about pop; stars might read an article about Madonna and be presented a list of Madonna-related products such as musical recordings, clothing, etc. The presentation of the recommended products might be done immediately as the site visitor is browsing, or upon returning to the web site, or in an e-mail, or other delayed form of notification.

Similarly, ATRS can work in conjunction with a regular search engine to narrow the results to a more precise recommended set of documents. In one embodiment, ATRS 4 is a front-end system of a network search engine. ATRS 4 analyzes the text of an interest set of documents, groups the interest set of documents into clusters; extracts keywords from the text of the documents grouped into the clusters; and communicates the selected keywords of the clusters to the search engine. The search engine uses these keywords to search the network for documents that matches the keywords and other filtering criteria that may be set up for the application.

Figure 10A:
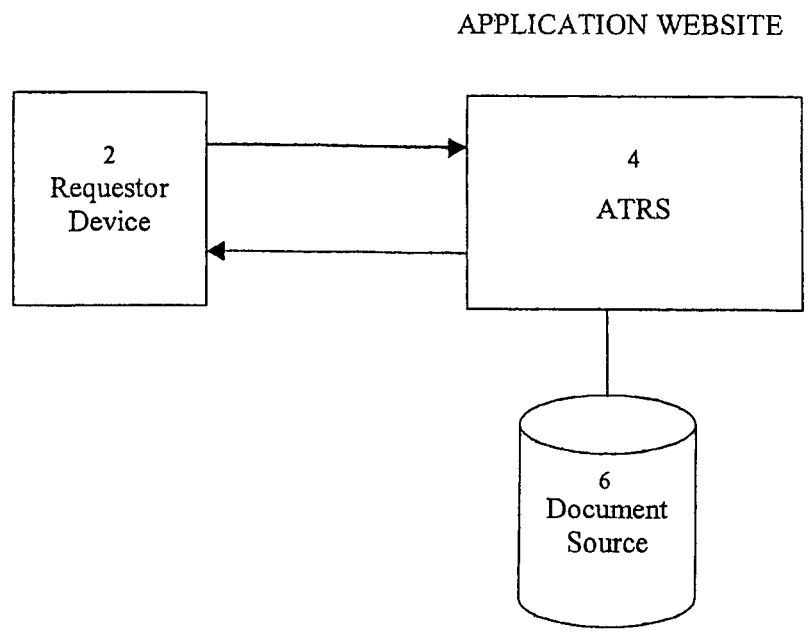
Figure 10B:
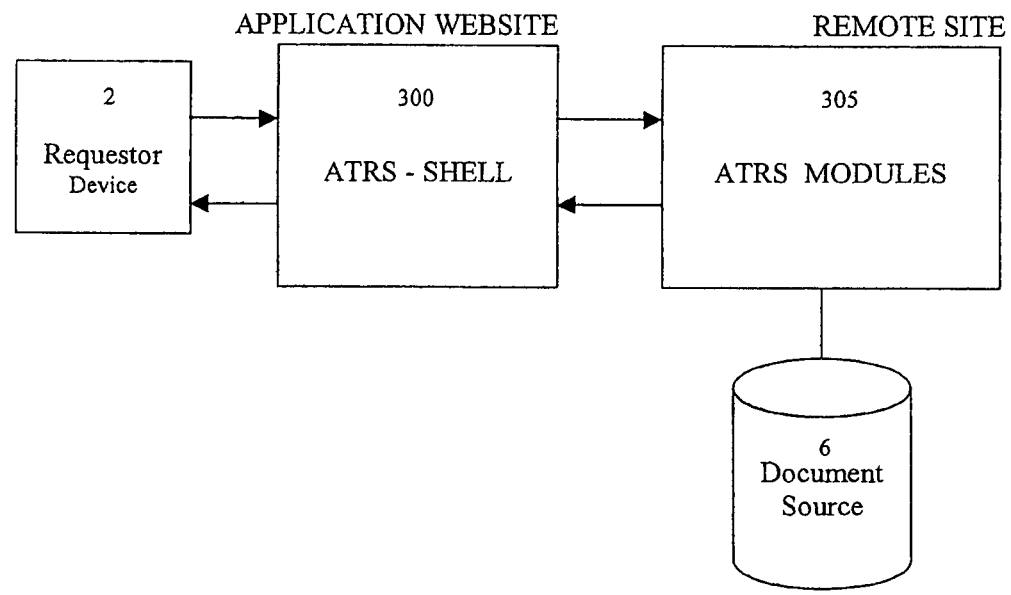
FIG. 10B is an architectural diagram of ATRS operable in a distributed manner with segments running at the application website and at a remote site, according to one embodiment of the present invention.

FIG. 10A is an architectural diagrams where the requestor device 2 may be a PC used by a client to access a website and ATRS 4 is manually or automatically invoked upon accessing the site. The document source 6 may be at the website or may be the entire Internet. FIG. 10B shows an alternative embodiment of the present invention wherein the requestor device 2 is essentially unchanged but the application website 300 for ATRS 4 only hosts the ATRS shell 300 or application proxy and the ATRS modules 305 are operable in a remote site. Document source 6 may be operable in a distributed manner at the same or different remote site as the ATRS modules 305. Alternatively, document source 6 may be the entire Internet.

Figure 11:
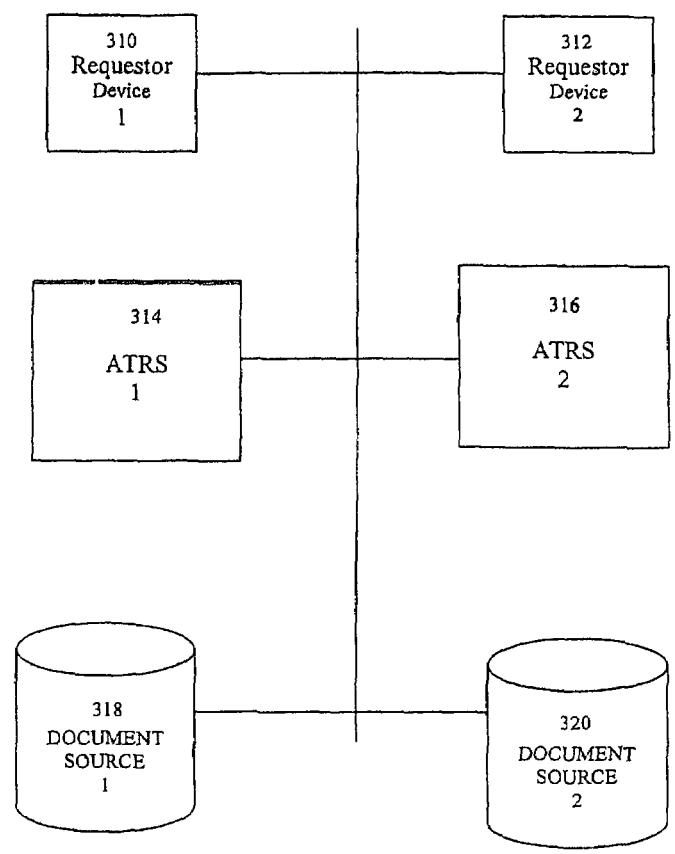
FIG. 11 is an architectural diagram illustrating the deployment of multiple applications of ATRS in and outside the United States, according to one embodiment of the present invention.

FIG. 11 is an architectural diagram illustrating the deployment of multiple applications of ATRS 4 in and outside the United States, according to the present invention. Requestor device 1 310, is in the United States, and Requestor device 2 312, is located outside of the United States. Requestor device 1 310 and Requestor device 2 312, are coupled to ATRS 1 314 in the United States and or ATRS 2 316 located outside of the United States. Document Source 1 318 is in the United States whereas Document Source 2 320 is outside the United States and both are coupled to and provide eligible documents for ATRS 1 314 and or ATRS 2 316.

Figure 12:
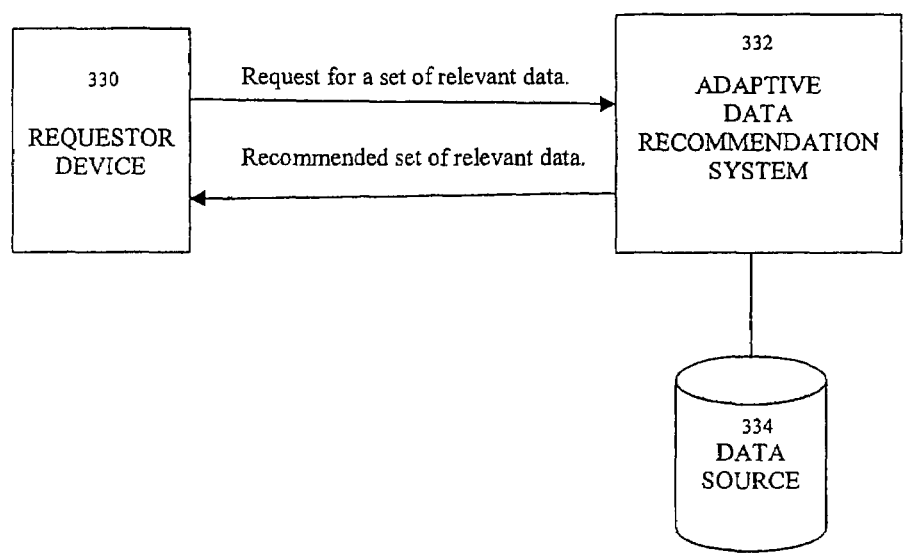
FIG. 12 is an architectural diagram of an adaptive data recommendation system in an alternative embodiment of the present invention, illustrating the data requestor device invoking and receiving a set of recommended relevant data.

FIG. 12 is an architectural diagram of an adaptive data recommendation system in an alternative embodiment of the present invention, illustrating the data requestor device 330 invoking and receiving a set of recommended relevant data from an adaptive data recommendation system 332 using data source 334.

Figure 13:
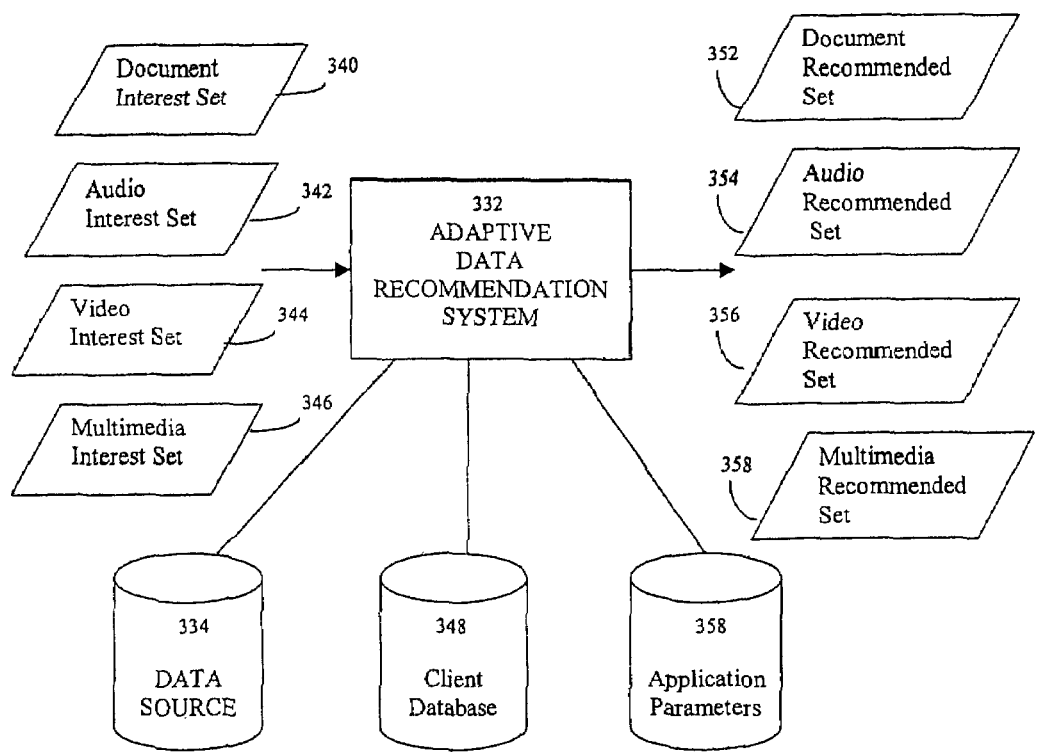
FIG. 13 is an architectural diagram illustrating the major input and output of an adaptive data recommendation system in an alternative embodiment of the present invention, illustrating the various types of data that are requested and returned to the requestor device.

FIG. 13 is an architectural diagram illustrating the major input and output of an adaptive data recommendation system in an alternative embodiment, of the present invention, illustrating the various types of data that are requested and returned to the requestor device. A document interest set 340, audio interest set 342, a video interest set 344, and or a multimedia interest set 346 are accessed by an adaptive data recommendation system 332, utilizing a data source 334, a client database 348, and application parameters 358 to create a recommended data set comprising document recommended set 350, audio recommended set 352, video recommended set 354, and multimedia recommended set 356. As an example, based on the description of various artists and their singing styles, a requestor device may specify certain singers with the type of songs and lyrics desired, an adaptive data recommendation system would cluster the songs and artists, extract keywords of the lyrics or key notes or note patterns in the artists' songs, and search sites containing libraries of artists and songs, and select for recommendation the downloadable songs relevant to requestor's criteria. The recommendation could be streaming audio or streaming video that can be played at the requestor device.

One implementation of the present invention is on a Linux OS running Apache web server with a MySQL database. However, a person knowledgeable in the art will readily recognize that the present invention can be implemented in different operating systems, different web servers with other types of data bases but not limited to Oracle and Informix.

A person knowledgeable in the art will readily recognize that the present invention can be implemented in a portable device comprising a controller; memory; storage; input accessories such a keyboard, pressure-sensitive pad, or voice recognition equipment; a display for presenting the recommended set; and communications equipment to wirelessly-connect the portable device to an information network. In one embodiment, the ATRS computer readable code can be loaded into the portable device by disk, tape, or a hardware plug-in, or downloaded from a site. In another embodiment, the logic and principles of the present invention can be designed and implemented in the circuitry of the portable device.

Foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

What is claimed is:

1. A method for adaptive information recommendation, the method comprising:
   storing user-specific information in memory, the user-specific information concerning user activity with a plurality of documents; and
   executing instructions stored in memory, wherein execution of the instructions by a processor:
      clusters an interest set of documents associated with the user activity into one or more clusters, wherein clustering an interest set of documents comprises:
         assembling the interest set of documents,
         pre-processing words of the interest set of documents, and
         grouping documents from the interest set of documents into the clusters utilizing a clustering algorithm that maximizes a cluster score of the clusters, wherein the cluster score is an average similarity score between the documents in the cluster,
      identifies a keyword for a cluster of the one or more clusters, the keyword identified based on natural language input by a user and representing the theme of the documents in the cluster,
      identifies a set of eligible documents within the cluster of the one or more clusters, each identified document containing either the keyword or the natural language input by the user representing the theme of the documents,
      filters the set of eligible documents in the cluster to meet an application criterion, the application criterion based on the user-specific information stored in memory and a user-defined limit on document age, wherein filtering documents does not require user interaction, and
      adaptively constructs a recommended set of documents for the cluster from the filtered set of eligible documents based on relevance to the keyword or the natural language input wherein constructing the recommended set of document includes:
         calculating a relevance score of each document in the filtered set of eligible documents, wherein the relevance score is based on a number of times the keyword or the natural language input by the user representing the theme appears in each document in the filtered set of eligible documents,
         selecting documents of the filtered set of eligible documents with high relevance scores, and
         applying a selection criterion measuring popularity of the document in the filtered set of eligible documents.

2. The method of claim 1, wherein the interest set of documents comprises a document previously accessed by the user.

3. The method of claim 1, wherein identifying a keyword for the one or more clusters includes calculating a plurality of keyword scores corresponding to the one or more clusters and selecting the keyword that maximizes the keyword score of the cluster, wherein calculating a keyword score is based on a frequency of a keyword in the interest set and a frequency of the keyword in the cluster.

4. The method of claim 1, wherein the interest set of documents is an interest set of offer descriptions, the keyword represents the theme of the offer description, the eligible set of documents is an eligible set of offer descriptions, and the recommended set of documents is a recommended set of offer descriptions.

5. A non-transitory computer-readable storage medium having embodied thereon a program, the program being executable by a processor to perform a method for adaptive information recommendation, the method comprising:
   storing user-specific information in memory, the user-specific information concerning user activity with a plurality of documents;
   clustering an interest set of documents associated with the user activity into one or more clusters, wherein clustering an interest set of documents comprises:
      assembling the interest set of documents,
      pre-processing words of the interest set of documents, and
      grouping documents from the interest set of documents into the clusters utilizing a clustering algorithm that maximizes a cluster score of the clusters, wherein the cluster score is an average similarity score between the documents in the cluster;
   identifying a keyword for a cluster of the one or more clusters, the keyword identified based on natural language input by the user and representing the theme of the documents in the cluster;
   identifying a set of eligible documents within the cluster of the one or more clusters, each identified document containing either the keyword or the natural language input by the user representing the theme of the documents;
   filtering the set of eligible documents in the cluster to meet an application criterion, the application criterion based on the user-specific information stored in memory and a user-defined limit on document age, wherein filtering documents does not require user interaction; and
   adaptively constructing a recommended set of documents for the cluster from the filtered set of eligible documents based on relevance to the keyword or the natural language input, wherein constructing the recommended set of document includes:
      calculating a relevance score of each document in the filtered set of eligible documents, wherein the relevance score is based on a number of times the keyword or the natural language input by the user representing the theme appears in each document in the filtered set of eligible documents,
      selecting documents of the filtered set of eligible documents with high relevance scores, and
      applying a selection criterion measuring popularity of the document in the filtered set of eligible documents.

6. The non-transitory computer-readable storage medium of claim 5, wherein the interest set of documents comprises a document previously accessed by the user.

7. The non-transitory computer-readable storage medium of claim 5, wherein identifying a keyword for the one or more clusters includes calculating a plurality of keyword scores corresponding to the one or more clusters and selecting the keyword that maximizes the keyword score of the cluster, wherein calculating a keyword score is based on a frequency of a keyword in the interest set and a frequency of the keyword in the cluster.

8. The non-transitory computer-readable storage medium of claim 5, wherein the interest set of documents is an interest set of offer descriptions, the keyword represents the theme of the offer description, the eligible set of documents is an eligible set of offer descriptions, and the recommended set of documents is a recommended set of offer descriptions.

9. An apparatus for providing adaptive information recommendations, the apparatus comprising:
- a memory configured to store user-specific information concerning user activity with a plurality of documents; and
- a processor configured to execute instructions stored in memory, wherein execution of the instructions by the processor:
  - clusters an interest set of documents associated with the user activity into the cluster, wherein clustering an interest set of documents comprises:
    - assembling the interest set of documents,
    - pre-processing words of the interest set of documents, and
    - grouping documents from the interest set of documents into the clusters utilizing a clustering algorithm that maximizes a cluster score of the clusters, wherein the cluster score is an average similarity score between the documents in the cluster,
  - identifies a keyword for a cluster of the one or more clusters, the keyword identified based on natural language input by the user and representing the theme of the documents in the cluster,
  - identifies a set of eligible documents within the cluster of the one or more clusters, each identified document containing either the keyword or the natural language input by the user representing the theme of the documents,
  - filters the set of eligible documents in the cluster to meet an application criterion, the application criterion based on the user-specific information stored in memory and a user-defined limit on document age, wherein filtering documents does not require user interaction, and
  - adaptively constructs a recommended set of documents for the cluster from the filtered set of eligible documents based on relevance to the extracted keyword or the natural language input, wherein constructing the recommended set of document includes:
    - calculating a relevance score of each document in the filtered set of eligible documents, wherein the relevance score is based on a number of times the keyword or the natural language input by the user representing the theme appears in each document in the filtered set of eligible documents,
    - selecting documents of the filtered set of eligible documents with high relevance scores, and
    - applying a selection criterion measuring popularity of the document in the filtered set of eligible documents.

* * * * *